United States Patent [19]
Torihata

[11] Patent Number: 5,267,068
[45] Date of Patent: Nov. 30, 1993

[54] SIGNAL TRANSMISSION PERFORMANCE EVALUATION DEVICE IN AN OPTICAL COMMUNICATION APPARATUS

[75] Inventor: Shigenori Torihata, Kanagawa, Japan

[73] Assignee: Kabushiki Kaisha Komatsu Seisakusho, Tokyo, Japan

[21] Appl. No.: 776,361
[22] PCT Filed: Mar. 26, 1991
[86] PCT No.: PCT/JP91/00387
 § 371 Date: Nov. 26, 1991
 § 102(e) Date: Nov. 26, 1991
[87] PCT Pub. No.: WO91/15903
 PCT Pub. Date: Oct. 17, 1991

[30] Foreign Application Priority Data

Mar. 30, 1990 [JP] Japan ................................ 2-85379

[51] Int. Cl.$^5$ .................. H04B 10/08; H04B 10/00
[52] U.S. Cl. ................................ 359/110; 359/154; 371/5.1
[58] Field of Search ............ 359/166, 110, 132, 133, 359/162, 154, 158; 371/5.1, 5.5; 375/58; 455/69; 372/58

[56] References Cited

U.S. PATENT DOCUMENTS

| | | | |
|---|---|---|---|
| 4,429,392 | 1/1984 | Yoshida et al. | 372/58 |
| 4,767,979 | 8/1988 | Tanigawa | 323/316 |
| 4,777,653 | 10/1988 | Bonnerot et al. | 455/73 |
| 4,825,113 | 5/1989 | Sato et al. | 359/119 |

OTHER PUBLICATIONS

Masashi Asano, Method for Diagnosing Optical Transmission Line, Jun. 23, 1988.

Primary Examiner—Edward L. Coles, Sr.
Assistant Examiner—Rafael Bacares
Attorney, Agent, or Firm—Diller, Ramik & Wright

[57] ABSTRACT

The evaluation of the signal transmission performance of an optical communication apparatus used when communication for control purposes is made using optical communication in general industrial machines such as presses. An electric current having a magnitude in a predetermined range is fed stepwise to a light emitting element (33) of a transmission optical link (3), a frame signal which includes an electric current value code indicative of the magnitude of the electric current fed to light emitting element (33) is simultaneously delivered to a receiver (20) through optical fiber (5) from a transmitter (10). The receiver (20) detects the occurrence of an communication error on the basis of an error check code of the frame signal transmitted by the transmitter (10), and determines a range of the magnitude of an electric current fed to the light emitting element where no communication errors occur from the contents of the electric current value code contained in the frame signal and the result of the detection of the occurrence of the communication errors. The transmitter (10) changes the magnitude of the electric current fed to the light emitting element (33) and detects the magnitude. When the receiver (20) receives the frame signal, it checks the error check code contained in the frame signal to detect a communication error, and determines a range of the magnitude of the fed electric current where no communication errors occur from the result of the detection of the communication error and the result of the detection of the electric current fed to the light emitting element (33).

2 Claims, 9 Drawing Sheets

SIGNAL TRANSMISSION PERFORMANCE EVALUATION DEVICE IN AN OPTICAL COMMUNICATION APPARATUS

TECHNICAL FIELD

The present invention relates to signal transmission performance evaluation devices in optical communication apparatus used when intra-factory communication, and communication for control of general industrial machines such as presses are performed using optical communication.

BACKGROUND ART

An optical communication system is used when required data is transmitted between control devices disposed at various points in a press.

In such optical communication system, the following preprocess is performed to operate the system.

First, optical fibers are extended on the spot as optical transmission channels between the control devices. It is then checked whether the extended optical fibers have obtained a desired optical transmission characteristic. The optical fibers are then connected to the control devices to thereby construct the optical communication system.

A preprocess such as extension of the series of the optical fibers or the evaluation of the transmission performance of the optical fibers is conventionally performed as follows.

As shown in FIG. 14, an optical fiber 5 each end of which is already subjected to either required processing or connector attachment is extended between control devices. Optical fiber 5 is then connected at one end to a standard light source 6 such as an LED and at the other end to an optical power meter 8. After the connection, light source 6 is operated, the light emitted by light source 6 is entered into optical fiber 5, and the intensity of the light passing through optical fiber 5 is read by power meter 8. The operator views the scale of optical power meter 8 and determines whether there is an abnormal attenuation in the optical power compared to the length of optical fiber 5 to thereby determine whether the extension of optical fiber 5 is satisfactory or not. As a result, there are no problems, optical fiber 5 is connected at either ends to transmission optical link 3' of communication device 7 and to reception optical link 4' of communication device 9, as shown by white arrows to thereby operate the optical communication system. Like this, there are many cases in which when optical fiber 5 is reconnected to reception links 3', 4', the optical power fed to optical fiber 5 is adjusted in transmission link 3' in accordance with a quantity of optical power attenuation (in proportion to the length of optical fiber 5) transmitted through optical fiber 5. The adjustment of the fed optical power is generally performed by changing the current fed to the LED which is a light source in transmission optical link 3'.

FIG. 15 illustrates an circuit disposed in transmission link 3' for adjusting the optical power.

As shown in FIG. 15, distance selection switch 38 is switched manually in accordance with the length of optical fiber 5 or the communication distance. Switch 38 selectively switches current limiting resistors 35, 36, 37 different in resistance value disposed between the power source and LED 33 to change the light emission output from LED 33. Transistor 34 is turned on/off in accordance with a signal applied to its base terminal to thereby modulate light emitted by LED 33. Assume that the resistance values $R_L$, $R_M$, $R_H$ of resistors 35, 36, 37 have the relationship $R_H < R_M < R_L$. Resistor 37 for a long distance, resistor 36 for an intermediate distance, and resistor 35 for a short distance are selected by switch 38 when the optical power transmitted through optical fiber 5 is high, immediate and low, respectively.

As just described above, the conventional techniques require works of extending optical fiber 5 on the spot, and connecting optical fiber 5 to the standard optical source 6 and power meter 8, and optical links 3', 4'. During extension and connection of such optical fiber 5, optical fiber 5 is exposed at each end to air. If the environment where the work is done is within a machine tool, an oil and/or dust exist. Therefore, even if the transmission characteristic of light is checked using optical power meter 8, the characteristic measured in the actual communication cannot often be obtained because the fiber end faces are rendered dirty due to the environment when optical fiber 5 is connected to optical link 3', 4'.

The connections of optical fiber 5 and optical links 3', 4' or between optical fiber 5 and standard light source 6, optical power meter 8 vary in transmission characteristic each time connection is made, so that the reading of optical power meter 8 as it is does not necessarily indicate the transmission characteristic in the actual communication.

One light emission diode (LED 33)used as the light emitting source in transmission optical link 3' may generally differ greatly in emission efficiency from the ideal one (forward current vs. light emission intensity) and the light intensity is influenced by the environmental temperature. Therefore, switch 38 of FIG. 15 must be switched and the optical power must be adjusted in consideration of the respective varying characteristics of the links. However, the conventional techniques cannot measure the individual characteristics of the links. Thus, the trouble with the conventional techniques is that the characteristics of links 3', 4' must be checked using another measuring instrument.

The photodetector of reception optical link 4' may differ in sensitivity from the ideal one, so that the reading optical power meter 8 as it is does not necessarily indicate the transmission characteristic in the actual use.

Optical fiber 5 extended on the spot may differ greatly from the ideal one in transmission performance when it is connected to the optical link, and the transmission characteristic to the optical fiber-optical link connection system cannot be evaluated correctly in the conventional technique.

The applicant has invented a device which is capable of performing extension and connection of an optical fiber without exposing it to a bad environment rich of oil and/or dust in a machine tool, as mentioned above. This device extends an optical fiber connected beforehand to an optical link, then performs a connecting work at an electric connector of the optical link which is less likely to be rendered dirty.

The present invention has been made in view such situation. It is an object of the present invention to provide a device which is capable of correctly evaluating the signal transmission performance in the actual communication in an optical communication system where the connection of an optical signal line to both control devices at the electric connectors of the optical link is performed as preprocessing.

DISCLOSURE OF THE INVENTION

A first invention is an optical communication apparatus comprising a transmission optical link including a transmitter and a light emitting element at a transmission end, a reception optical link including a receiver and a photodetector at a reception end, and an optical signal line connecting the transmission and reception optical links, wherein: the transmitter comprises: current feeding means for feeding an electric current having a plurality of different magnitudes to the light emitting element; and frame signal generating means for sending a frame signal comprising an electric current value code indicative of the magnitude of an electric current fed to the light emitting element by the current feeding means and an error check code for detecting the occurrence of a communication error; and the receiver comprises: error detecting means for detecting the occurrence of an error on the basis of the error check code contained in the received frame signal; and determining means for determining an appropriate range of the current fed to the light emitting element on the basis of the contents of the current value code contained in the received frame signal and the result of the detection by the error detecting means, whereby the electric current fed to the light emitting element is adjusted in accordance with the result of the determination by the determining means.

A second invention is an optical communication apparatus comprising a transmission optical link including a transmitter and a light emitting element at a transmission end, a reception optical link including a receiver and a photodetector at a reception end, and an optical signal line connecting the transmission and reception optical links, wherein: the transmitter comprises: current value changing means for changing the magnitude of the electric current fed to the light emitting element; fed current value detecting means for detecting the magnitude of the current fed to the light emitting element by the current value changing means; and frame signal generating means for transmitting a frame signal including an error check code to detect the occurrence of a communication error while the current fed to the light emitting element is being changed by the current value changing means; and the receiver comprises: error detecting means for detecting the occurrence of an error on the basis of the error check code contained in the received frame signal; whereby the receiver determines an appropriate range of the current fed to the light emitting element on the basis of the result of the detection by the fed current detecting means and the result of detection by the error detecting means and adjusts the current fed to the light emitting element on the basis of the contents of the determination.

According to the arrangement of the first invention, an electric current having a stepwise changing amplitude in a predetermined range is delivered to the light emitting element in the transmitter. Simultaneously, an electric current value code indicative of the magnitude of the current fed to the light emitting element is included in the frame signal, which is then delivered to the receiver. The receiver checks the occurrence of communication errors between the transmitter and receiver on the basis of the error check code of the frame signal delivered by the transmitter. The range of the magnitude of the current fed to the light emitting element where no communication errors occur is properly determined from the contents of the current value code delivered by the transmitter and the result of the detection of the occurrence of the communication errors. If the current delivered to the light emitting element is adjusted in accordance with the result of this determination, exact signal transmission is achieved.

According to the second invention, the magnitude of the current fed to the light emitting element is changed in the transmitter. At this time, the magnitude of the current fed to the light emitting element is detected. In the receiver, the occurrence of communication errors between the transmitter and receiver is detected on the basis of the error check code delivered by the transmitter. Therefore, the range of magnitude of the current fed to the light emitting element where no communication errors occur is properly determined from the result of the detection of the magnitude of the current fed to the light emitting element and the result of the detection of the occurrence of the communication errors. Thus, if the current fed to the light emitting element is adjusted in accordance with the contents of the determination, exact signal transmission is achieved.

BEST MODE FOR CARRYING OUT THE INVENTION

Figure 2:
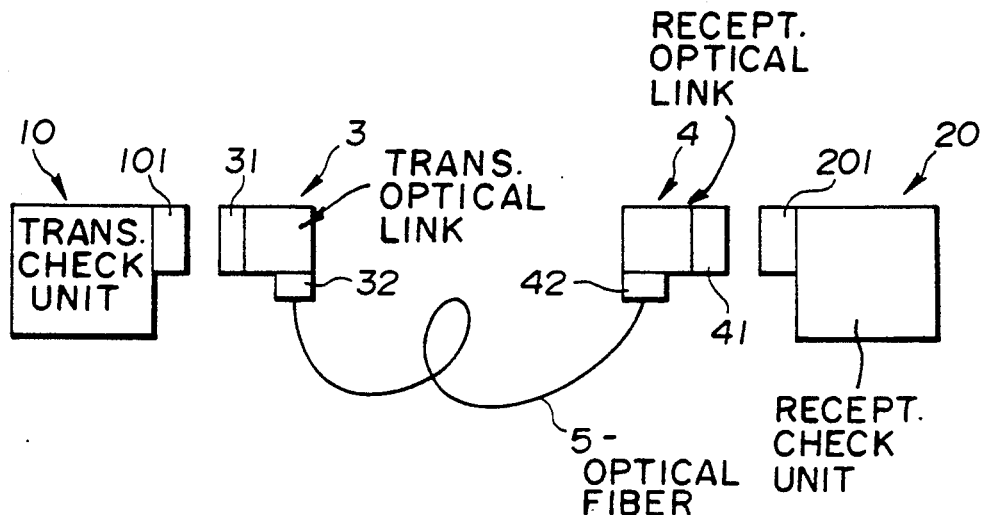
FIG. 2 conceptually illustrates the entire structure of the embodiment device of the signal transmission performance evaluation device.

The present invention will be described hereinafter in detail with reference to the accompanying drawings. FIG. 2 shows the entire structure of the device of the embodiment.

Figure 14:
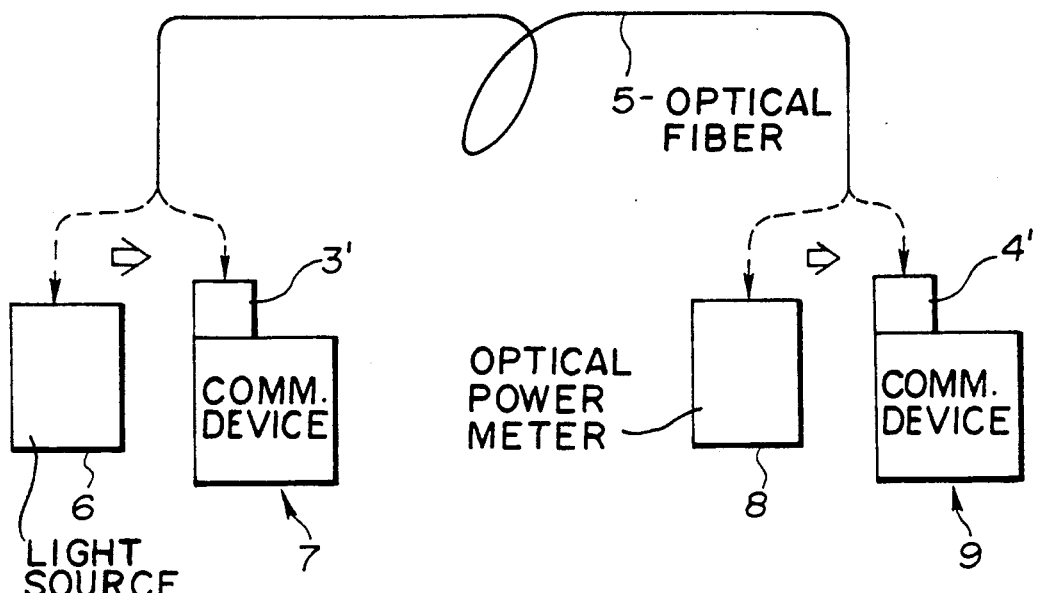
FIG. 14 illustrates the signal transmission performance evaluation of a conventional optical communication apparatus.

As shown in FIG. 2, the embodiment device mainly includes a transmission check unit 10 which has a real communication function of communication device 7 shown in FIG. 14 and a transmission check function to be described later, reception check unit 20 which has a real communication function of communication device 9 and a reception check function to be described later, and optical fiber 5 including a transmission channel for communication light between transmission and reception check units 10 and 20, both the ends of which fiber are connected to transmission and reception optical links (hereinafter referred to as transmission and reception links) 3 and 4, respectively. Actually, there are many communication devices before transmission check unit 10 and also after reception check unit 20. Transmission check unit 10 is required to have a reception check function in relationship to the communication device of the preceding stage while reception check unit 20 also is required to have a transmission check function in relationship to the communication device of the subsequent stage. For convenience of explanation, it is assumed that communication is made only between transmission and reception check unit 10 and 20.

Transmission check unit 10 includes electric connector 101 connected electrically to electric connector 31 of transmission link 3. Reception check unit 20 also includes electric connector 201 connected electrically to electric connector 41 of reception link 4. Transmission link 3 includes electric connector 31 which receives an electric signal, and optical fiber connector 32 which connects and fixes one end of optical fiber 5 to transmission link 3. Reception link 4 includes optical fiber connector 42 which connects and fixes the other end of optical fiber 5 to reception link 4, and electric connector 41 which outputs an electric signal.

Figure 15:
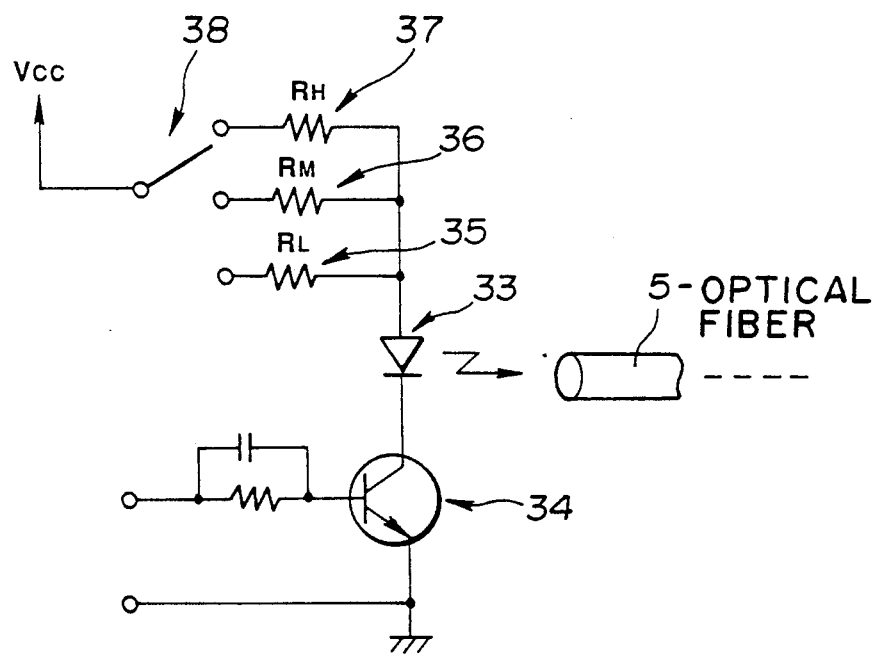
FIG. 15 is a circuit diagram indicative of an internal circuit of a transmission link of FIG. 14.

Transmission link 3 has a circuit structure similar to that of transmission link 3' of FIG. 15 and an electro/optical converter which includes LED 33 as the center (shown by the dot-dashed line in FIG. 1) and which converts the electric signal received through electric connector 31 in LED 33 to an optical signal. Reception link 4 also includes an optical/electrical converter (not shown) which converts the optical signal transmitted through optical fiber 5 to an electric signal and outputs it from electric connector 41.

Now assume that the work of extending optical fiber 5 has been made. In order to evaluate the signal transmission performance of optical fiber 5 including transmission and reception link 3 and 4, electric connectors 31 and 41 of transmission and reception links 3 and 4 are connected to connectors 101 and 201 of transmission and reception check units 10 and 20, respectively.

Figure 1:
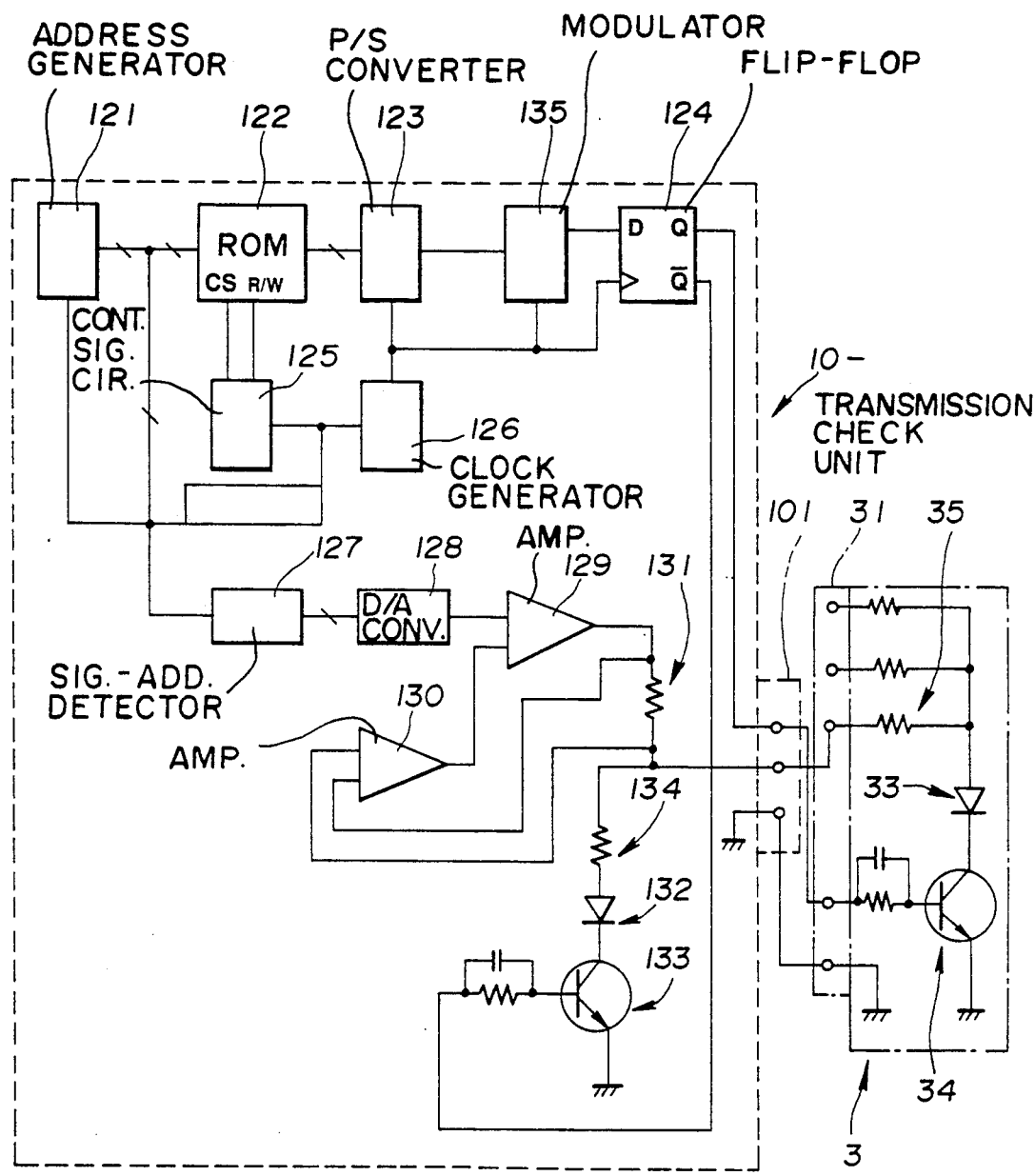
FIG. 1 is a circuit diagram illustrating the structure of a transmission check unit in an embodiment of a signal transmission performance evaluation device in an optical communication apparatus according to the present invention.

FIG. 1 shows the respective circuit structures of transmission check unit 10 (shown by the broken lines) and reception link 3 (shown by a dot-dashed line), thus connected.

ROM 122 of transmission check unit 10 stores data shown conceptually on the following table.

TABLE

| ADDRESS | DATA |
|---------|------|
| 0 0 0 0 | STARTING CODE |
|         | CURRENT VALUE CODE (2 mA) |
| \|       | RANDOM SIGNAL CODE |
|         | ERROR CHECK CODE |
|         | STOPPING CODE |
| 0 F F F | BLANK |
| 1 0 0 0 | STARTING CODE |
|         | CURRENT VALUE CODE (4 mA) |
| \|       | RANDOM SIGNAL CODE |
|         | ERROR CHECK CODE |
|         | STOPPING CODE |
| 1 F F F | BLANK |
| \|       |       |
| F 0 0 0 | STARTING CODE |
|         | CURRENT VALUE CODE (32 mA) |
| \|       | RANDOM SIGNAL CODE |
|         | ERROR CHECK CODE |
|         | STOPPING CODE |
| 1 F F F | BLANK |

In the Table, addresses 0000-FFFF are divided into 16 groups for each of the most significant bytes 0-F (16). Sequentially stored as data at each of addresses having the most significant byte "0", that is, 0000 to 0FFFF, a starting code, a current value code indicative of an electric current value of 2 mA, a random signal code involving a random number, an error check code made of the electric current value code and random signal code, and a stopping code. Subsequently stored at each of addresses the most significant byte of which is 1, 2, . . . , F is data on a protocol such as a starting code, an electric current value code, . . . similar to those for the most significant byte 0 with a theoretical structure of the current value code in which the electric current value sequentially increases like 4, 8, . . . 32 mA.

Clock generator 126 generates a clock signal having a predetermined period. Control signal circuit 125 and address generator 121 sequentially deliver the data stored in ROM 122 to parallel/serial converter (hereinafter referred to as P/S converter) 123 synchronously with the clock signal generated.

In this case, the procedures of delivery of the data stored in the ROM 122 are performed as follows. For example, data at addresses 0000-0FFF the most significant byte of which is "0" are delivered sequentially and ten times repeatedly, and then the data at addresses 1000-1FFF the most significant byte of which is "1" are delivered sequentially and ten times repeatedly. Thereafter, similarly, the data at addresses the most significant bytes of which are 2, 3, . . . respectively, are delivered sequentially and ten times repeated until the most significant byte of the address is F is reached. If the data at the address the most significant byte of which is F is delivered completely, the data again start to be delivered similarly and repeatedly, starting with the data at the address the most significant byte of which is 0.

Figure 4:
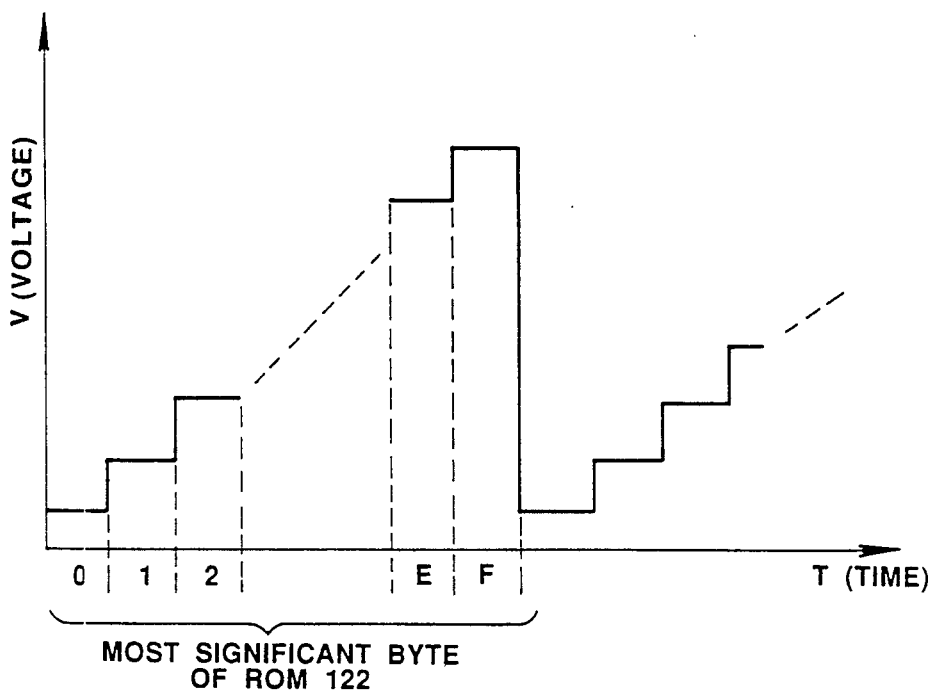
FIG. 4 is a graph indicative of a change in the output of D/A converter of FIG. 1.

Address generator 121 outputs an address designating signal for such delivery to ROM 122 and the most significant-address detector 127. Detector 127 which detects the most significant byte 0-F (made of 4 bits) of addresses 0000-FFFF in ROM 122 in accordance with the address designating signal received and outputs a detection signal indicative of the most significant byte to D/A converter 128, which outputs a (analog) signal which becomes a predetermined voltage value in accordance with the received detection signal (digital signal). It outputs an analog signal such that its output voltage increases a predetermined voltage value by a predetermined voltage value as the most significant byte increases like 0, 1, .... In this case, address generator 121 repeatedly designates the addresses the most significant bytes of which are 0-F, as mentioned above, so that the output voltage of D/A converter 128 increases stepwise repeatedly from the most significant byte 0 to the most significant byte F as time T passes, as shown in FIG. 4.

The output of D/A converter 128 is applied to operational amplifier 129, which controls the current flowing through LED 33 of transmission link 3 in accordance with an output signal from D/A converter 128. The operation of operational amplifier 129 will be described hereinafter.

The output current from operational amplifier 129 flows into current limiting resistor (for a short distance) 35, LED 33 and transistor 34 from shunt resistor 131 through electric connectors 101, 31. The output current flows also into current limiting resistor 134, LED 132, transistor 133 from shunt resistor 131.

Output data from ROM 122 is subjected to parallel/serial conversion in P/S converter 123, is modulated in modulator 135 in a predetermined manner and then input to a D terminal of D-flip-flop 124, a clock terminal of which receives a clock signal from clock generator 126. Flip-flop 124 outputs from Q, $\overline{Q}$ terminals signals in logically inverted relationship. The $\overline{Q}$ output is applied to the base of transistor 133 while the Q output is applied to the base of transistor 34 of transmission link 3. Thus, the base inputs of transistors 133 and 34 are in logically inverted relationship.

Current limiting resistor 134 has the same value as current limiting resistor 35 of transmission link 3. LED 132 has the same quality as LED 33 of transmission link 3 (generally, in LEDs, the respective forward voltages are low in unevenness compared to light emission efficiencies). Similarly, transistor 133 has the same type as transistor 34 of transmission link 3.

Figure 5:
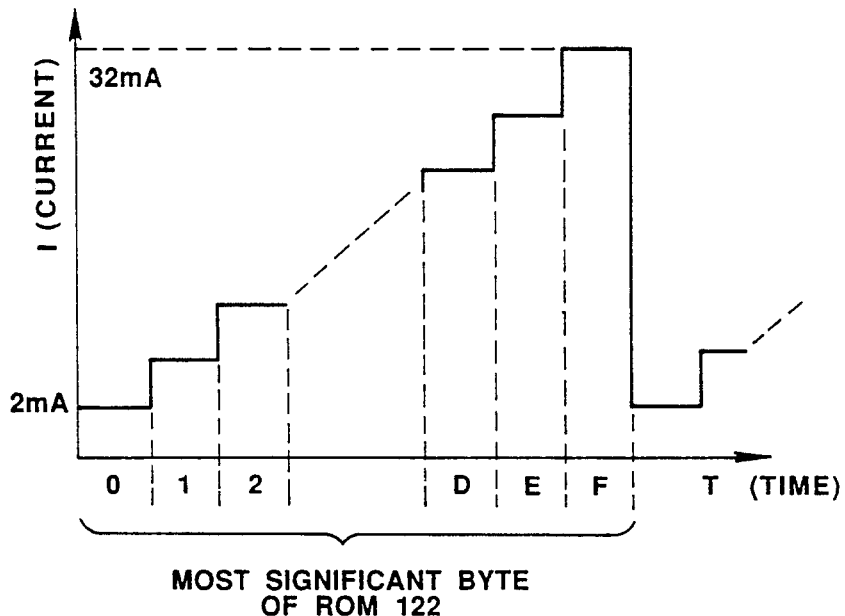
FIG. 5 is a graph indicative of changes in the magnitude of a current flowing through a shunt resistor of FIG. 1.

As mentioned above, since the base inputs to transistor 34 and 133 are in logically inverted relationship, the current flowing through shunt resistor 131 is a DC current. A voltage drop due to this DC current is amplified by floating amplifier 130 the amplified output from which is applied together with the output from D/A converter 128 to input terminals of operational amplifier 129. The output from operational amplifier 129 changes so as to be the same as the output from D/A converter 128. By doing so, the current flowing through current limiting resistor 35 from shunt resistor 131 changes as shown in FIG. 5 in accordance with the output (FIG. 4) of D/A converter 128. That is, a current value conforming to the current value code of the data output from ROM 122 flows through current limiting resistor 35 such that, for example, if the contents of the current value code of the data output from ROM 122 are 2 mA, a 2 mA current flows through current limiting resistor 30.

Figure 6:
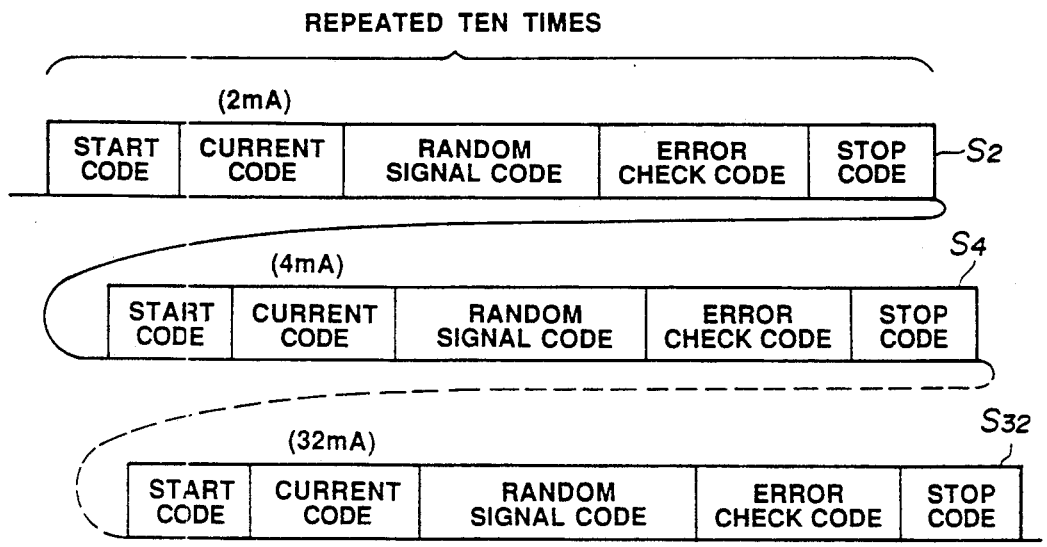
FIG. 6 schematically illustrates a protocol for a frame signal transmitted through the optical fiber of FIG. 2 via the LED of FIG. 1.

Therefore, LED 33 connected to resistor 35 changes its light emission output to sequentially in accordance with the electric current conforming to the contents of the electric current value code. Transistor 34 modulates light in accordance with the Q output from flip-flop 124 applied to the base terminal thereof. In this way, as shown in FIG. 6, frame signals are sequentially delivered, each including a real communication code the contents of which are control data in a real communication, namely, a current value code and a random signal code; a starting code disposed directly before the real communication code and indicating the head of the real communication code; an error check code disposed directly after the real communication code for checking the presence/absence of error generation on the basis of the contents of the real communication code; a stopping code disposed directly after the error check code for designating the end of the frame. That is, first, frame signal $S_2$ in which the contents of current value code are a 2 mA current value is delivered ten times successively in a serial manner to optical fiber 5. The optical power at this time has a magnitude conforming to the 2 mA current value passing through LED 33. Thereafter, frame signal $S_4$ in which the contents of the current value code are a 4 mA current value is delivered ten times successively with optical power having a magnitude conforming to the current value. Thereafter, each of frame signals in which the current values of the current value codes are increased 2 mA by 2 mA respectively, is similarly delivered ten times successively until the current value arrives at 32 mA (signal $S_{32}$). Each of these signals $S_2$-$S_{32}$ again is similarly delivered ten times repeatedly. The processing performed by reception check unit 20 will be described hereinafter in conjunction with FIG. 3.

Figure 3:
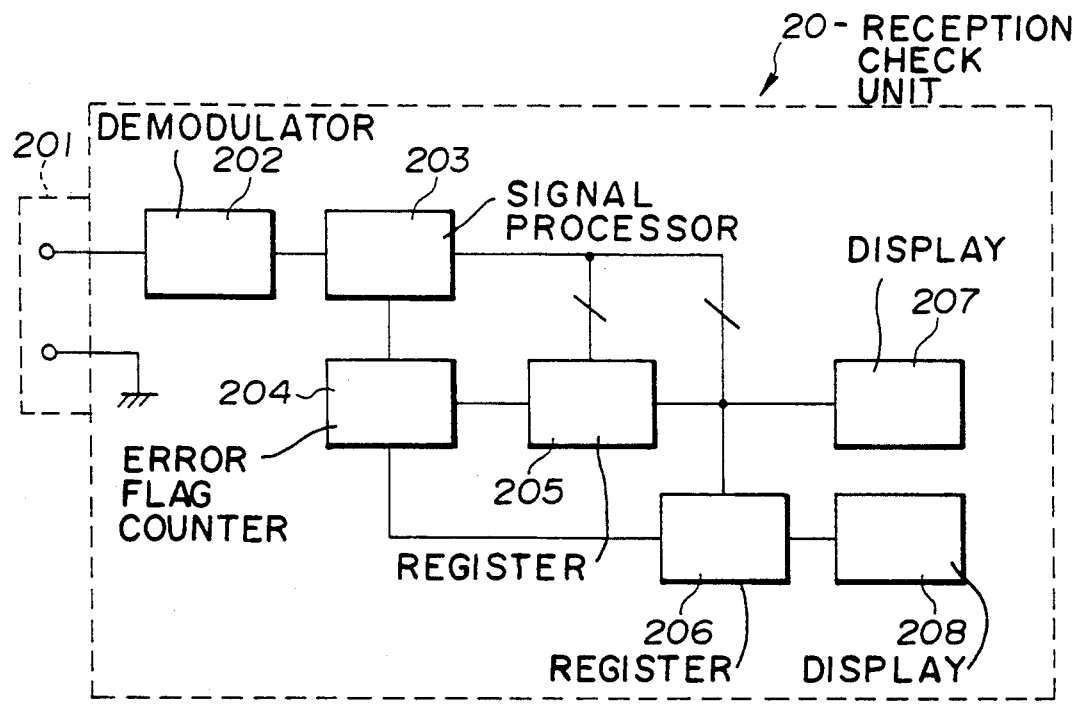
FIG. 3 is a circuit diagram illustrating the structure of a reception check device in the embodiment.

Connected to electric connector 201 of reception check unit 20 shown in FIG. 3 is electric connector 41 (not shown) of reception link 4 in the evaluation of the signal transmission performance of optical fiber 5.

Optical/electrical converter of reception link 4 converts optical signal $S_2$-$S_{32}$ delivered through optical fiber 5 to corresponding electric signals, and outputs these signals from electric connector 41. Demodulator 202 demodulates received signals $S_2$-$S_{32}$ through electric connector 41 of reception link 4 and connector 201 in a required demodulation system, and outputs the demodulated signal to signal processor 203, which decodes signals $S_2$-$S_{32}$. Especially, it checks an error check code and hence whether errors have occurred for each frame, namely, whether a real communication code is received correctly, for example, using a CRC check system or a vertical-horizontal parity check system. If it is determined that an error has occurred as the result of the checking, an error flag is transferred to error flag counter 204. Signal processor 203 outputs the contents of the current value code to registers 205 and 206. Error flag counter 204 counts received error flags to determine whether five successive frames where no errors have occurred are received. Now assume that five successive frames where no errors have occurred, for example, at 6 mA are received, error flag counter 204 gives a command to register 205. In response to the command, register 205 outputs to display 207 a signal indicative of the current value (6 mA) stored at that time. In response to this signal, display 207 displays "LOWEST CURRENT VALUE of 6 mA WHERE NO ERRORS HAVE OCCURRED", for example.

Thereafter, as the current value (the contents of the current value code) increases, error flag counter 204 determines that, for example, five successive frames where no errors have occurred at a current value, for example, of 24 mA are not delivered. In this case, error flag counter 204 gives a command to register 206, which, in response to this signal, outputs to display 208 a signal indicative of the current value (22 mA) just preceding the current value (24 mA) the data on which currents is stored at that time. In response to this signal, display 208 displays "HIGHEST CURRENT VALUE OF 22 mA WHERE NO ERRORS HAVE OCCURRED", for example.

The operator can determine the highest and lowest values of the current passing through LED 33 which causes correct data to be transmitted through optical fiber 5 by viewing displays 207, 208. At this time, the operator is able to evaluate, using the current value flowing through LED 33, the signal transmission performance of the optical transmission channel including optical fiber 5 as well as transmission/reception links 3, 4. Therefore, the operator is able to switch and select the switch 38 on the basis of the evaluation and hence to adjust the value of the current flowing through LED 33 to an optimal one.

While in the embodiment the initial value of the current flowing through LED 33 is shown as 2 mA and as being increased to 32 mA of the final value in steps of 2 mA, the present invention is not limited to this specified example, of course. The initial value, increasing rate and final value of the current are optional. The number of repetitions of delivery of frame signals is not limited to 10. The threshold value with which determination is made in error flag counter 204 is not limited to five successive times, but is optional.

The number of divisions of addresses in ROM 122 is not necessarily required to be 16. For example, 32 divisions such as 0000–07FF, 0800–0FFF, 1000–17FF, F000–F7FF, F800–FFFF may be employed and most significant-address detector 127 may detect the most significant two bytes.

While in the embodiment the frame signal is illustrated as being composed of a protocol including the starting code, current value code, random signal code, error check code, and stopping code, the sequence of the current value code, random signal code and error check code may be changeable. The bit length of the random signal code may be optional. The random signal code may be omitted when required.

The error check code may be beforehand calculated and stored in ROM 122 or may be generated by an external circuit.

Figure 7:
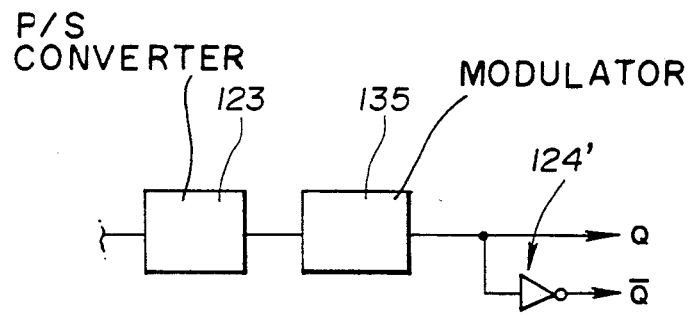
FIG. 7 partially illustrates a circuit structure using an inverter in place of a flip-flop of FIG. 1.

Inverter 124' shown in FIG. 7 may be used in place of flip-flop 124 of FIG. 1.

Figure 8:
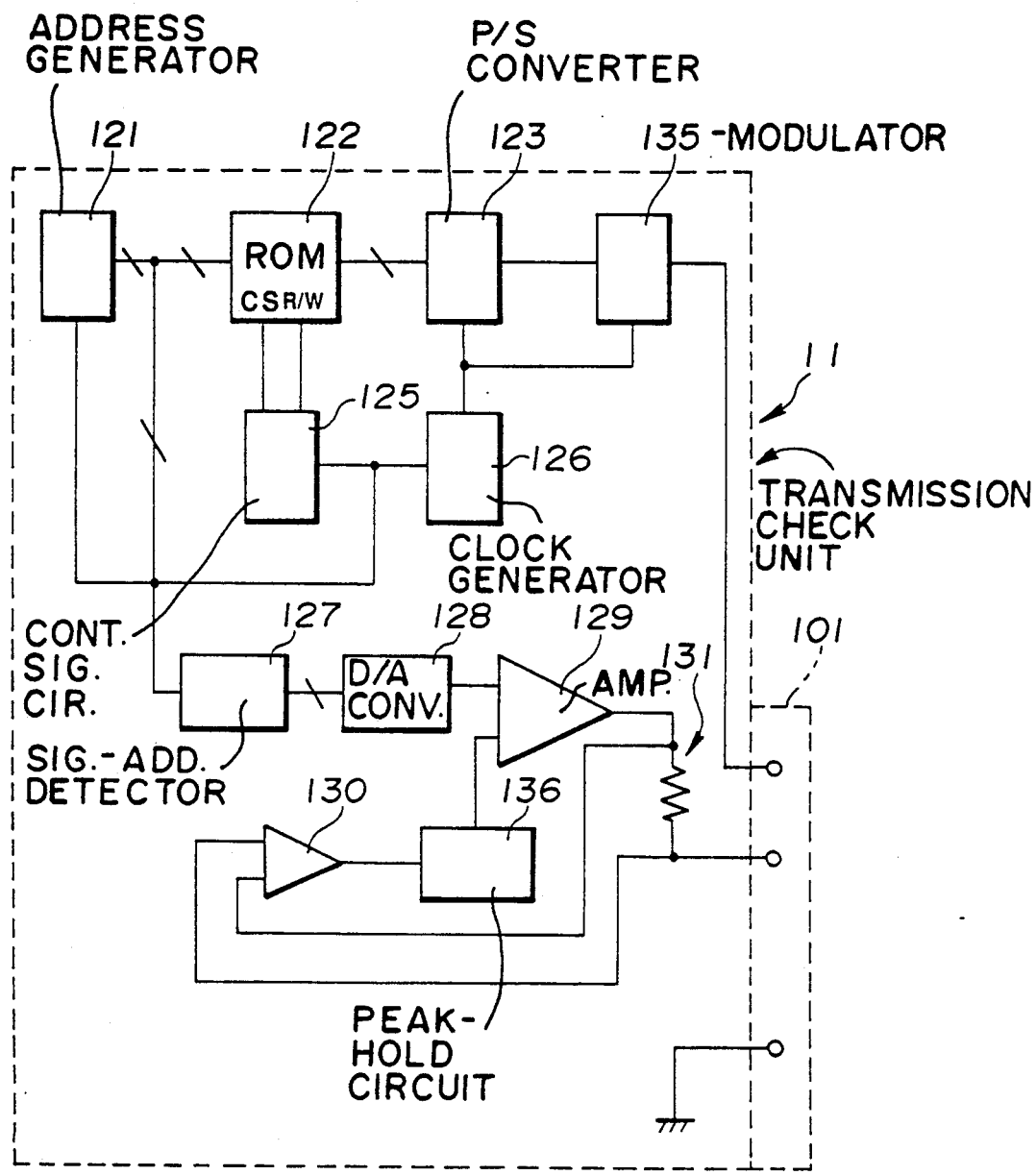
FIG. 8 is a circuit diagram illustrating another circuit structure of the transmission check device of FIG. 1.

As shown in FIG. 8, transmission check unit 11 may be implemented which uses no flip-flop such as 124 of FIG. 1, and employs peak-hold circuit 136 in place of current limiting resistor 134, LED 132, and transistor 133.

Modulator 135 may be omitted when required.

Another embodiment of the transmission performance evaluation device for an optical signal line according to the present invention will be described hereinafter.

In the present embodiment, its entire structure is basically the same as that shown in FIG. 2 except transmission check unit 10 of FIG. 1 and reception check unit 20 of FIG. 3. Elements having the same function in the present and above-mentioned embodiments are identified by the same reference numeral and their duplicate description will be omitted.

Figure 9:
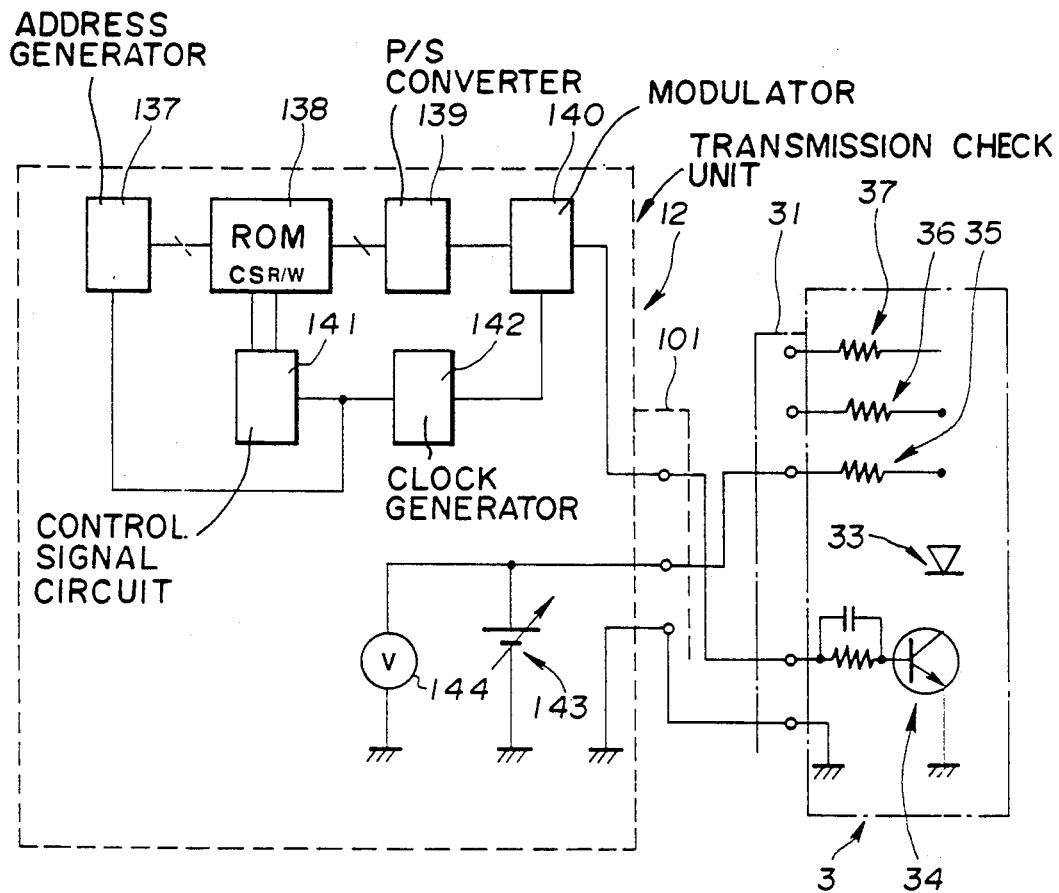
FIG. 9 is a circuit diagram illustrating the structure of the transmission check device in another embodiment of the inventive signal transmission performance evaluation apparatus.

Transmission check unit 12 corresponding to transmission check unit 10 of FIG. 1 is constructed as shown in FIG. 9. ROM 138 of FIG. 9 stores as data a starting code, random signal code, error check code and stopping code in order at each address as in ROM 122. ROM 138 differs from ROM 122 in that the former has no data corresponding to the current value code. The random signal code should, for example, be determined by a random number, and the error check code should be beforehand generated by the random signal code.

Like clock generator 126, clock generator 142 generates a clock signal synchronously with which control signal circuit 141 and address generator 137 deliver the data stored in ROM 138 to parallel/serial converter (hereinafter referred to as P/S converter) 139. This delivery is repeated until a power source for transmission check unit 12 is turned off. Address generator 137 delivers an address designating signal to ROM 138 such that the data stored in ROM 138 is delivered to P/S converter 139 repeatedly in the order of the starting code, random signal code, error check code, and stopping code.

The output data from ROM 138 is subjected to parallel/serial conversion in P/S converter 139, to required modulation in modulator 140, and then applied to the base of transistor 34 of transmission link 3 through electric connectors 101, 31.

Variable-voltage constant voltage circuit 143 provides an output voltage changed manually by operated means such as a dial (not shown) to current limiting resistor (for a short distance) 35, LED 33 and transistor 34 through electric connectors 101, 31. It may be applied to current limiting resistor 36, 37.

The resistance value of current limiting resistor 35 and forward voltage $V_F$ of LED 33 and $V_{CE(Sat)}$ of transistor 34 are beforehand known, so that if the output voltage of constant voltage circuit 143 is known, the value of a current flowing through LED 33 will be known. The output voltage from variable-voltage constant voltage circuit 143 is measured and displayed by voltmeter 144. Therefore, the operator can easily know the value of the current flowing through LED 33 by reading the display of voltmeter 144 visually.

As described above, if the output voltage from variable-voltage constant circuit 143 is applied across current limiting resistor 35, the light emission output from LED 33 is changed in accordance with the magnitude of the applied voltage and transistor 34 modulates light in accordance with the output from modulator 140 applied to the base terminal of transistor 34. In this way, transmitted repeatedly through optical fiber 5 through LED 33 is a frame signal including a random signal code in which a real communication code the contents of which are control data is positioned in the real communication, a starting code disposed directly before the random signal code and indicating the head of the random signal code, an error check code disposed directly after the random signal code for checking the occurrence of errors on the basis of the contents of the random signal code, and a stopping code disposed directly after the error check code and indicating the end of that frame, as shown in FIG. 11.

The processing performed by reception check unit 21 corresponding to the above-mentioned reception check unit 20 will be described in conjunction with FIG. 10.

Optical/electrical converter of reception link 4 converts the optical signal (FIG. 11) transmitted through optical fiber 5 to an electric signal, which is output from electric connector 41 and applied to demodulator 209 through electric connector 201.

Figure 11:
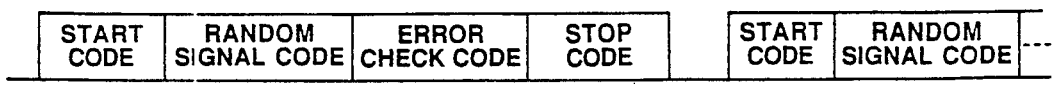
FIG. 11 schematically illustrates a protocol for the frame signal transmitted through the optical fiber of FIG. 2 through the LED of FIG. 9.

Demodulator 209 demodulates the received signal in a predetermined demodulation system and outputs the resulting demodulated signal to signal processor 210, which decodes the frame signal of FIG. 11. Especially, it checks the error check code. Namely, it checks whether the random signal code is transmitted correctly, by using, for example, a CRC check system or a vertical-horizontal parity check system. If it is determined that an error has occurred as a result of this checking, an error flag is transferred to error flag counter 211, which counts received error flag to sequentially determine whether five successive frame signals where no errors have occurred are delivered. If so, error flag counter 211 delivers to display 212 a signal indicating that no errors have occurred at present. In response to this signal, display 212 displays "NO ERROR HAVE OCCURRED". Conversely, if five successive frame signals in at least one of which an error has occurred are delivered, error flag counter 211 outputs to display 212 a signal indicative of the current occurrence of the error, and display 212 displays "ERRORS HAVE OCCURRED".

The procedures of evaluating the signal transmission characteristic using such embodiment device will be described hereinafter.

The evaluation of the signal transmission performance requires at least two operators. One operator A is at transmission check unit 12, connects electric connector 101 of transmisstion check unit 12 to electric connector 31 of transmission link 3, turns on the power source for transmission check unit 12 and causes the transmission check device to operate, as mentioned above.

The other operator B is at reception check unit 21, connects electric connectors of check unit 21 and reception link 4 to operate reception check unit 21.

Operator A then operates a dial in variable-voltage constant voltage circuit 143 to thereby increase the output voltage from constant voltage circuit 143 gradually from its lowest voltage.

While the output voltage from constant circuit 143 is low, the value of the electric current flowing through LED 33 is low as well. Therefore, the power fed from LED 33 to optical fiber 5 is low. Accordingly, the frame signals are not transmitted correctly and display 212 of reception check unit 21 displays "ERRORS HAVE OCCURRED". As the output voltage from constant circuit 143 increases, the current fed to LED 33 increases and hence the power fed to optical fiber 5 increases until the output voltage value from constant circuit 143 arrives at a predetermined voltage and display 25 displays "NO ERRORS HAVE OCCURRED".

At this time, operator B signals by hand "NO ERRORS HAVE OCCURRED" to operator A. In response to this signaling, operator A reads the voltage value on constant voltage circuit 143 indicated by voltmeter 144 and converts it to an electric current value. In this way, operator A is able to know the lowest current value in which no errors occur as in the previous embodiment. If the distance between operators A and B is large and both the operators cannot view each other, data transmission means such as a transceiver may be used.

Thereafter, when operator A continuously increases the output voltage from constant voltage circuit 143, display 212 displays "NO ERRORS HAVE OCCURRED" for the time being, but it starts to display "ERRORS ARE OCCURRING" again when the predetermined output voltage value is reached. At this time, operator B signals to operator A, who reads the voltage value of voltmeter 144 at that time and converts it to the value of a current. Thus, operator A is able to know the highest current value where no errors occur.

As just described above, in the present embodiment, the operator is able to determine the lowest and highest values of electric currents flowing through LED 33 and capable of transmitting corrent data through optical fiber 5 using the display by voltmeter 144. At this time, the operator is able to evaluate, using the value of the current flowing through LED 33, the signal transmission performance of the optical transmission channel including the optical fiber as well as transmission and reception link 3, 4. Thus, he is able to switch or select switch 38 or to adjust the value of the current flowing through LED 33 to an optimal one on the basis of the evaluation.

While in the embodiment the threshold with which error flag counter 211 makes determination is five successive frame signals, the present invention is not limited to this and the number of successive frame signals is optional.

While in the embodiment the frame signal is shown as being composed of a protocol including a starting code, random signal code, error check code and stopping code arranged in this order, the sequence of the random signal code and error check code may be reversed.

The error check code may be beforehand calculated and stored in ROM 138 or may be generated by an external circuit.

Figure 10:
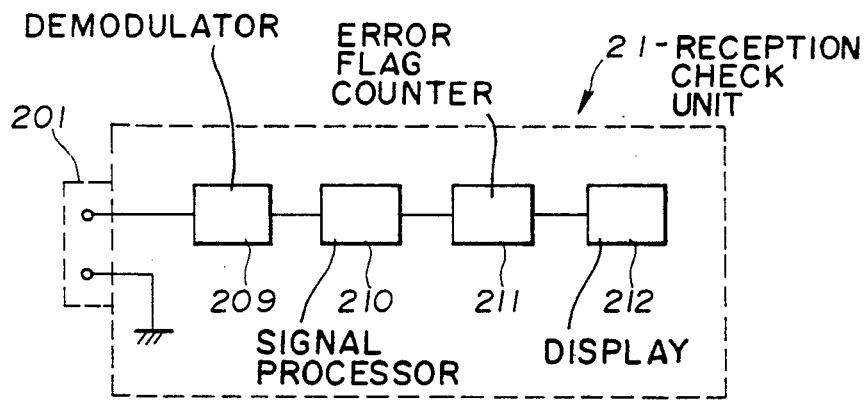
FIG. 10 is a circuit diagram illustrating the structure of a reception check device in another embodiment.

Modulator 140 of FIG. 9 may be omitted when required, in which case the demodulator 209 of FIG. 10 may also be omitted.

Figure 12:
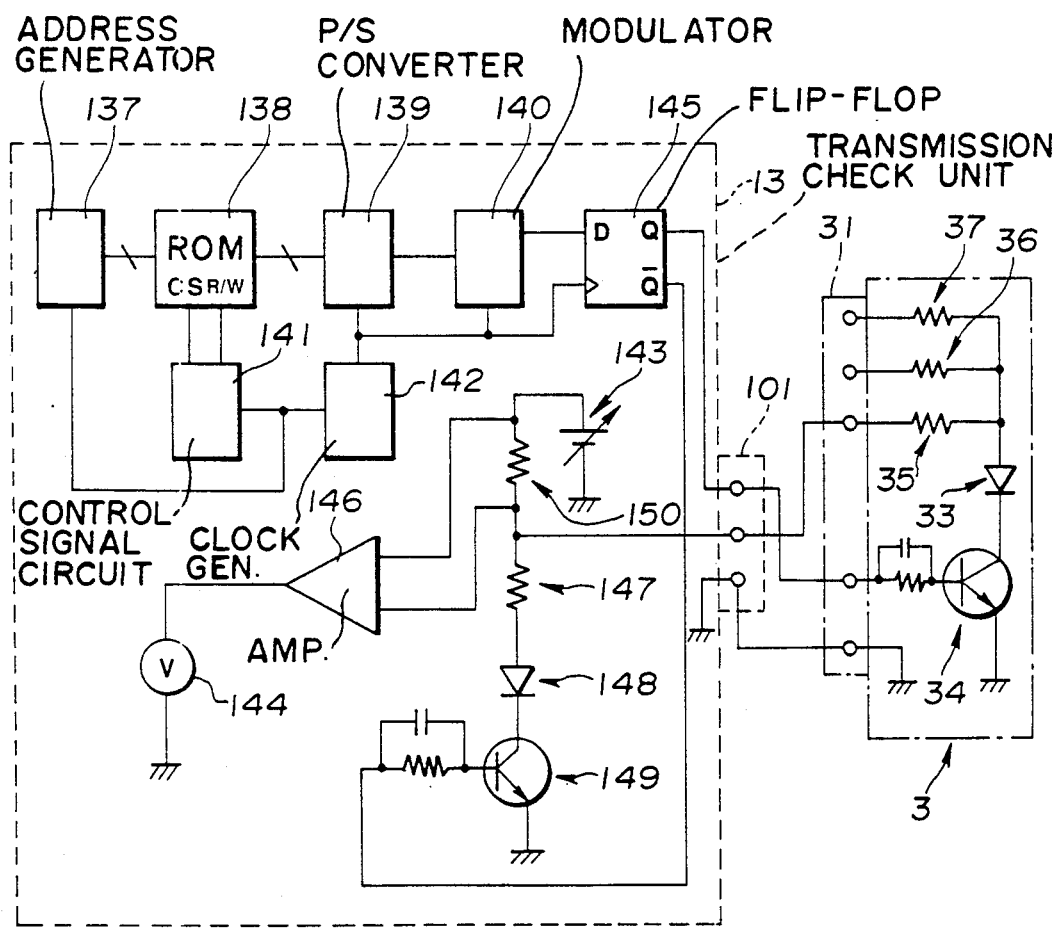
FIG. 12 is a circuit diagram illustrating another circuit structure of the transmission check device of FIG. 9.

FIG. 12 shows the structure of transmission check unit 13 which, compared to that in FIG. 9, greatly reduces an error in the measured current value due to the resistance value of current limiting resistor 35, forward voltage $V_F$ of LED 33, and $V_{CE(Sat)}$ of transistor 34 being different from the concentration ideal ones of those elements.

As shown in FIG. 12, the output from modulator 140 is input to the D terminal of D-flip-flop 145 into a clock terminal of which a clock signal generated by clock generator 142 is input. Flip-flop 145 outputs from Q, $\overline{Q}$ terminals signals in logically inverted relationship. The $\overline{Q}$ output is applied to the base terminal of transistor 149 while the Q output is applied to the base terminal of transistor 34 of transmission link 3. Thus, the base inputs to transistor 149 and 34 are in logically inverted relationship.

Current limiting resistor 147 has the same resistance value as current limiting resistor 35. LED 148 has the same quality as LED 33. Similarly, transistors 149 and 34 are of the same type.

The output voltage from variable-voltage constant voltage circuit 143 is applied through shunt resistor 150, current limiting resistor 147, and LED 148 to transistor 149 and then to current limiting resistor 35, LED 33 and transistor 34 of transmission link 3 through electric connectors 101, 31.

As mentioned above, since the base inputs to transistors 34 and 149 are in logically inverted relationship, the current flowing through shunt resistor 150 becomes an DC current. The voltage drop across shunt resistor 150 due to the DC current is amplified by floating amplifier 146 and the resulting voltage is measured and displayed by voltmeter 144. Therefore, the operator is able to easily know the value of the current flowing through LED 33 by reading the display on voltmeter 144 visually. As just described, this embodiment does not measure the output voltage as it is from constant voltage circuit 143, but a voltage drop across shunt resistor 150 due to the DC current flowing through shunt resistor 150, so that an error in the measured current value due to the forward voltage across LED 33 being different from the ideal one, etc., is reduced to thereby provided high accuracy measurement.

Figure 13:
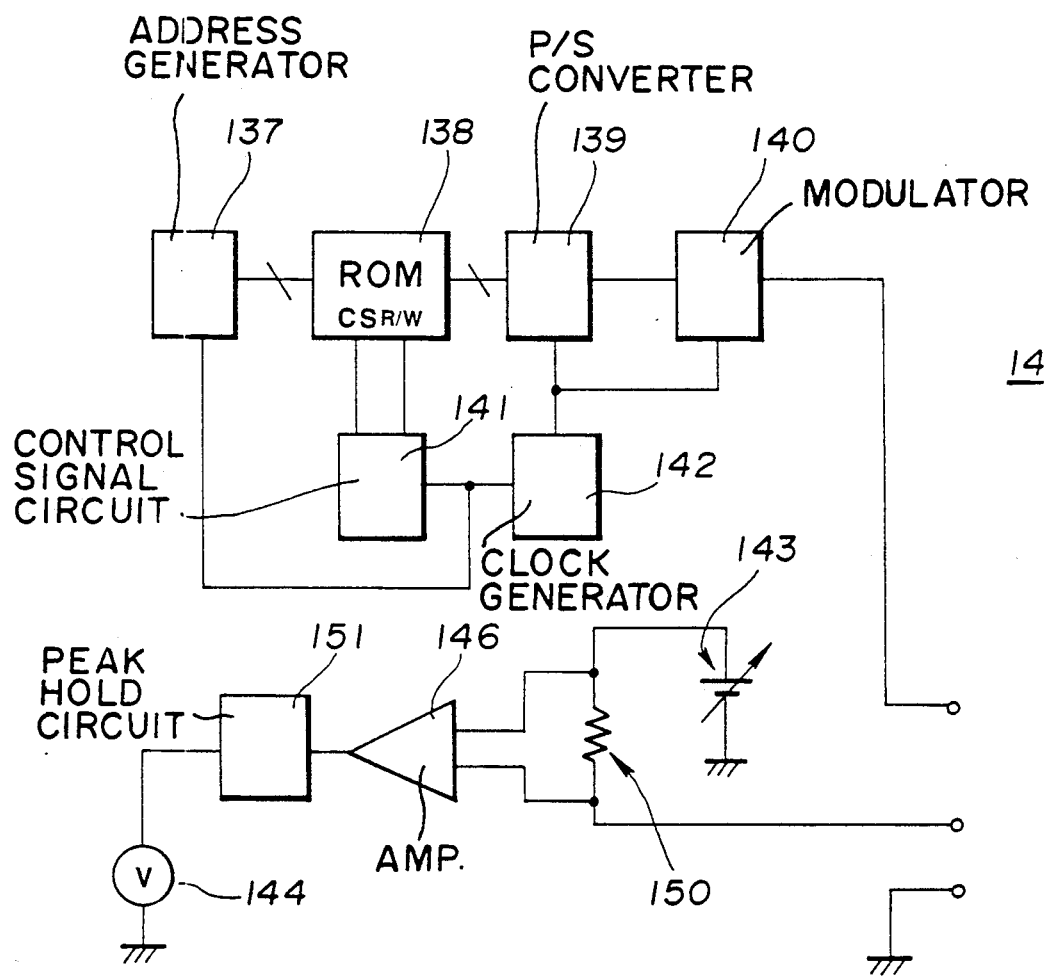
FIG. 13 is a circuit diagram illustrating a modification of the transmission check device of FIG. 12.

As shown in FIG. 13, arrangement may be such that flip-flop 145, current limiting resistor 147, LED 148 and transistor 149 of FIG. 12 are omitted, but peak hold circuit 151 is newly added after floating amplifier 146 to thereby measure the peak voltage value captured by peak hold circuit 151 using voltmeter 144.

While in the present embodiment at least two operators are positioned such that one operator instructs the other operator to read the display on voltmeter 144, a system which performs this operation automatically can be provided, for example, by using a structure in which the transmission and reception check units are connected be required signal lines or by radio such that the contents of display 212, namely, "NO ERRORS ARE OCCURRING", "ERRORS ARE OCCURRING" are delivered sequentially from the reception check unit to the transmission check unit through those signal lines or by radio and that the transmission check unit automatically outputs the received sequential contents of display 212.

While in the embodiment the optical fiber is shown as being used as a transmission medium for the optical signal, the present invention is not limited to the use of the optical fiber and any signal lines may be used which are capable of transmitting an optical signal.

While in the embodiment the LED is shown as being used as an element which converts an electric signal to an optical signal, the present invention is not limited to the use of the LED. Any light emitting element which is capable of converting an electric signal to an optical signal may be used.

While in the embodiment the display is shown as displaying whether errors are occurring or not at the receiver, any output means may be used which indicates the result of determining whether errors have occurred. For example, such result may be printed out.

As described above, according to the present embodiment, the following advantages are produced.

Since reconnection involving the exposure of an end face of the optical signal line is not performed in the evaluation of the signal transmission characteristic of the optical communication apparatus, no difference occurs in signal transmission performance between the evaluation and the actual communication due to the signal line end face being dirtied, so that accurate evaluation is achieved.

Since in the embodiment the evaluation of a signal line which receives and outputs an optical signal is not only performed, but also the evaluation of the optical transmission channel is performed which includes the transmission link which receives an electric signal, converts this signal to an optical signal and outputs it to the signal line, and the reception link which converts the transmitted optical signal to an electric signal and outputs this signal, the evaluation is performed involving the inclusion of a deviation of the link from the ideal one. Thus, there is no troublesome operation which takes a deviation of the link from the ideal one into consideration and greatly improves the efficiency of the evaluating work. Although there is a deviation, from the ideal one, of the light emission efficiency of a light emitting element such as an LED in the transmission link, it is not required to be considered separately.

In the embodiment a quantity of an electric current fed to an light emitting element such as the LED in the transmission link and to be adjusted in the actual communication is measured to thereby evaluate the performance of the optical signal line, so that information optimal for the adjustment of the transmission intensity in the actual communication is obtained to thereby provide accurate adjustment of the transmission intensity. The present invention also produces an advantage of evaluating a noise margin using the measured quantity of the electric current fed.

In the present embodiment, serial frame signals are transmitted through the optical signal line and evaluated as in the real communication, so that a deterioration in the performance due to dispersion occurring when an optical fiber is especially used as the optical signal line can be evaluated simultaneously.

Similarly, the evaluation is performed in the state of the real communication, so that an error check code can be checked and hence the rate of error occurrence can be gripped in an environment of electromagnetic noise.

INDUSTRIAL APPLICABILITY

As mentioned above, the present invention is applicable when the signal transmission performance of an optical communication apparatus is evaluated.

I claim:

1. An optical communication apparatus comprising a transmission optical link including a transmitter and a light emitting element at a transmission end, a reception optical link including a receiver and a photodetector at a reception end, and an optical signal line connecting the transmission and reception optical links,
   said transmitter comprising:
   current feeding means for stepwisely changing values of an electric current and sequentially feeding the electric current having the stepwisely changed values to said light emitting element;
   transmitting means, when the electric current having the stepwisely changed current values is being sequentially fed to said light emitting element by said current feeding means, for sequentially transmitting a frame signal comprising an electric current value code indicative of the current value of the electric current being fed and an error check code for detecting the occurrence of a communication error;
   adjusting means for adjusting the current value of the electric current fed to said light emitting element;
   said receiver comprising:
   error detecting means for detecting the occurrence of an error on the basis of the error check code contained in the received frame signal;
   detecting means for detecting a minimum current value and a maximum current value with which the communication error does not occur on the basis of the content of the electric current value code contained in the received frame signal and a detection result of said detecting means;
   display means for displaying the minimum and maximum current values detected by said detecting means,
   wherein said adjusting means is manually adjusted so that the current value of the electric current fed to said light emitting element is set to be a predetermined current value between the minimum current value and the maximum current value displayed on said display means.

2. An optical communication apparatus comprising a transmission optical link including a transmitter and a light emitting element at a transmission end, a reception optical link including a receiver and a photodetector at a reception end, and an optical signal line connecting the transmission and reception optical links, said transmitter comprising:

current value changing means for changing a current value of the electric current fed to said light emitting element by manually changing a voltage applied to said light emitting element;

applied voltage detecting means for detecting the voltage applied to said light emitting element;

transmission end display means for displaying a detection result of said applied voltage detecting means;

transmitting means, when the current value of the electric current fed to said light emitting element is being changed by said current value changing means, for sequentially transmitting a frame signal comprising an error check code for detecting the occurrence of a communication error; and adjusting means for adjusting the current value of the electric current fed to said light emitting element;

said receiver comprising:

error detecting means for detecting the occurrence of an error on the basis of the error check code contained in the received frame signal; and receiver end display means for displaying a detection result of said error detecting means, wherein the display content of said transmission end display means and the display content of said receiver end display means are collated to determine a minimum current value and a maximum current value with which the communication error does not occur with respect to the electric current fed to said light emitting element and said adjusting means is manually adjusted so that the current value of the electric current fed to said light emitting element is set to be a predetermined current value between the minimum current value and the maximum current value.

* * * * *